US009259713B2

(12) United States Patent
Maury et al.

(10) Patent No.: US 9,259,713 B2
(45) Date of Patent: Feb. 16, 2016

(54) PROCESS FOR THE PREPARATION OF A CATALYST USING AT LEAST ONE RAPID DRYING STAGE AND AT LEAST ONE FLUIDISED BED DRYING STAGE AND USE THEREOF FOR FISCHER-TROPSCH SYNTHESIS

(71) Applicant: IFP Energies nouvelles, Rueil-Malmaison Cedex (FR)

(72) Inventors: Sylvie Maury, Saint Maurice D'argoire (FR); Fabrice Diehl, Lyons (FR); Adrien Berliet, Lyons (FR); Joseph Lopez, Saint Julien les Rosiers (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 317 days.

(21) Appl. No.: 13/905,575

(22) Filed: May 30, 2013

(65) Prior Publication Data

US 2013/0324624 A1 Dec. 5, 2013

(30) Foreign Application Priority Data

May 30, 2012 (FR) ..................................... 12 01542

(51) Int. Cl.

| | |
|---|---|
| ***B01J 23/42*** | (2006.01) |
| ***B01J 23/75*** | (2006.01) |
| ***C10G 2/00*** | (2006.01) |
| ***B01J 37/08*** | (2006.01) |
| ***B01J 37/18*** | (2006.01) |
| ***B01J 37/02*** | (2006.01) |
| ***B01J 23/00*** | (2006.01) |
| ***B01J 23/46*** | (2006.01) |
| ***B01J 23/74*** | (2006.01) |
| ***B01J 35/00*** | (2006.01) |
| ***B01J 23/745*** | (2006.01) |
| ***B01J 23/755*** | (2006.01) |
| ***B01J 35/10*** | (2006.01) |
| *B01J 21/04* | (2006.01) |
| *B01J 21/06* | (2006.01) |
| *B01J 21/12* | (2006.01) |

(52) U.S. Cl.

CPC ................ *B01J 23/75* (2013.01); *B01J 23/005* (2013.01); *B01J 23/462* (2013.01); *B01J 23/74* (2013.01); *B01J 23/745* (2013.01); *B01J 23/755* (2013.01); *B01J 35/002* (2013.01); *B01J 35/006* (2013.01); *B01J 35/1019* (2013.01); *B01J 35/1042* (2013.01); *B01J 37/0205* (2013.01); *B01J 37/0207* (2013.01); *B01J 37/088* (2013.01); *B01J 37/18* (2013.01); *C10G 2/332* (2013.01); *C10G 2/333* (2013.01); *B01J 21/04* (2013.01); *B01J 21/06* (2013.01); *B01J 21/12* (2013.01)

(58) Field of Classification Search

CPC ........ B01J 23/75; B01J 23/005; B01J 23/462; B01J 23/74; B01J 23/745; B01J 23/755; B01J 35/002; B01J 35/006; B01J 35/1019; B01J 35/1042; B01J 37/0205; B01J 37/0207; B01J 37/088; B01J 37/18; C10G 2/332; C10G 2/333

USPC ........................................................ 502/326

See application file for complete search history.

(56) References Cited

U.S. PATENT DOCUMENTS

| | | | | |
|---|---|---|---|---|
| 8,071,655 | B2 * | 12/2011 | Diehl et al. | 518/715 |
| 2004/0186188 | A1 | 9/2004 | Van Berge et al. | |
| 2005/0234137 | A1 * | 10/2005 | Espinoza et al. | 518/716 |
| 2008/0039539 | A1 | 2/2008 | Espinoza et al. | |
| 2012/0016042 | A1 | 1/2012 | Maury et al. | |

FOREIGN PATENT DOCUMENTS

| | | |
|---|---|---|
| EP | 2 407 237 | 1/2012 |
| WO | WO-03 012008 | 2/2003 |
| WO | WO-2012 020210 | 2/2012 |

OTHER PUBLICATIONS

Search Report for FR1201542 dated Nov. 28, 2012.

* cited by examiner

*Primary Examiner* — Colleen Dunn
*Assistant Examiner* — Haytham Soliman
(74) *Attorney, Agent, or Firm* — Millen, White, Zelano and Branigan, P.C.

(57) ABSTRACT

Preparation of a catalyst comprising at least one metal from group VIII said process comprising stabilization of an oxide support, by impregnation of said oxide support, rapid drying, calcination of impregnated and dried oxide support, stabilization stage being followed at least once by impregnation of stabilized oxide support, drying of stabilized and impregnated oxide support operating in a fluidized bed in the presence of a gas, said support being subjected to a temperature rise ramp of between 0.5 and 5° C/min to attain a temperature of between 50 and 170° C, the residence time of said support once the drying temperature is reached being between 20 and 180 min, and calcination of said dried impregnated stabilized oxide support.

12 Claims, No Drawings

PROCESS FOR THE PREPARATION OF A CATALYST USING AT LEAST ONE RAPID DRYING STAGE AND AT LEAST ONE FLUIDISED BED DRYING STAGE AND USE THEREOF FOR FISCHER-TROPSCH SYNTHESIS

TECHNICAL FIELD

The present invention concerns the field of catalysts used for reactions for the synthesis of hydrocarbons from a gas mixture comprising carbon monoxide and hydrogen, generally referred to as Fischer-Tropsch synthesis, and more particularly a process for the preparation of a catalyst comprising an active phase comprising at least one metal from group VIII, preferably cobalt, and an oxide support, preferably silica-alumina.

PRIOR ART

It is well known to the man skilled in the art that synthesis gas can be converted into hydrocarbons in the presence of a catalyst containing metals from group VIII of the periodic table of elements such as iron, ruthenium, cobalt and nickel which catalyse the transformation of a CO and $H_2$ mixture referred to as synthesis gas (that is to say a mixture of carbon monoxide and hydrogen), possibly diluted with carbon dioxide or any other diluent alone or in the form of a mixture such as methane, nitrogen or ethane, into hydrocarbons which are solid, liquid or gaseous at ambient temperature. That process is known by the name of Fischer-Tropsch synthesis.

Different methods have been described and developed in the prior art to improve the preparation of Fischer-Tropsch catalysts based on cobalt supported by different supports. The most widely used supports being alumina, silica and titanium dioxide, sometimes modified by additional elements.

Thus U.S. Pat. No. 8,071,655 describes a way of improving the hydrothermal resistance of the catalysts by the formation of a spinel phase which is simple or mixed with aluminium contained in the support of a Fischer-Tropsch catalyst using a static drying stage in the stabilisation stage.

U.S. Pat. No. 6,806,226 describes by way of example cobalt-based catalysts. The cobalt-based Fischer-Tropsch catalysts described there suffer however from the disadvantage that they do not have a homogeneous cobalt distribution either in the catalyst grains or at the surface of the catalyst. The poor surface distribution of the cobalt occurs in the form of agglomeration and enrichment in cobalt at the surface and forms an external layer which is also referred to as the crust.

Indeed, when using catalyst in the form of particles of a granulometry of less than 500 μm in processes of slurry bubble column type homogeneous distribution and in particular the absence of crust is generally desirable. In fact, using a slurry process gives rise to a substantial mechanical stress for the catalyst, the distribution of the active metal in the form of a crust makes it more sensitive to attrition effects and may cause a loss of active metal with the passage of time. Excessively advanced aggregation of the metal at the periphery of the catalyst can also give rise to a loss in selectivity linked to stearic stresses (metal crystallites which are excessively aggregated together) limiting the growth of hydrocarbon chains and causing degradation of $C_{5+}$ selectivity (and consequently the probability of chain growth which is also referred to as alpha from the theoretical works of Anderson, Schulz and Flory which are well known to the man skilled in the art) in the hydrocarbon synthesis reaction.

The conventional procedures for preparation of catalysts used for Fischer-Tropsch synthesis generally comprise the following stages: impregnation of the support, drying, calcination and possible reduction.

A number of patents thus describe methods for the preparation of the catalysts used in Fischer-Tropsch synthesis, which are based on those conventional procedures and which aim to improve the distribution of cobalt in order to make it more homogeneous in the catalyst and to avoid the formation of a crust.

One of the ways of controlling the size, the size distribution of the crystallites and also their level of aggregation may involve optimising the drying and calcination conditions.

U.S. Pat. No. 6,806,226 describes a catalyst obtained by vacuum impregnation and partial vacuum drying at a temperature of between 60° C. and 95° C., followed by calcination at a temperature of between 75° C. and 400° C. with a temperature ramp of between 0.5° C./min and 1° C./min for hourly space velocities (HSV) of at least 1 $m^3$ of air/(Kg $Co(NO_3)_2$, $6H_2O$*h). That patent provides the possibility of much faster calcination with a temperature ramp of 100° C./min to eliminate nitrates if the HSV is higher.

The disadvantage of those procedures is that the catalyst still contains a great deal of water on issuing from the drying stage (partial drying is claimed) as all the water afforded by the impregnation operation is not removed. The presence of that water gives rise to the risk of disadvantaging homogeneous distribution of the cobalt in and at the surface of the catalyst.

Therefore the object of the present invention is to remedy one or more of the disadvantages of the prior art by proposing a process for the preparation of a catalyst comprising an active phase comprising at least one metal from group VIII selected from cobalt, nickel, ruthenium and iron, alone or as a mixture, and an oxide support which can be used in a Fischer-Tropsch synthesis process, having an increased hydrothermal resistance as well as an activity and selectivity which is maintained in respect of $C_5^+$ compounds in the Fischer-Tropsch synthesis process.

In fact surprisingly the applicant discovered that implementation of a stabilisation stage comprising a drying stage which is referred to as rapid drying under specific conditions followed by a linked sequence of at least an impregnation, fluidised bed drying and calcination stage possibly in a fluidised bed made it possible both:

to achieve a better distribution of the metal of group VIII in the support in the initial support stabilisation stage, thus facilitating the formation of the spinel phase in a strong interaction with the support by virtue of the rapid drying stage, this imparting enhanced hydrothermal resistance to the catalyst obtained, and a limitation in the formation of a crust or aggregates of metal from group VIII at the periphery of the catalyst grains for high levels of content of metal from group VIII.

Another object of the present invention is to provide a preparation process permitting the production of a catalyst which is highly active and selective in the Fischer-Tropsch synthesis process.

SUMMARY OF THE INVENTION

A subject of the present invention concerns a process for the preparation of a catalyst comprising an active phase comprising at least one metal from group VIII selected from cobalt, nickel, ruthenium and iron, alone or as a mixture, and an oxide support, which catalyst can be used in a Fischer-Tropsch synthesis process, said process comprising:

at least one stage for stabilisation of said oxide support, consisting of:

a stage for impregnation of said oxide support, a rapid drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute, and a stage for calcination of said impregnated and dried oxide support, said calcination operation being carried out in one or two stages, said stabilisation stage being followed by at least once the linked sequence of the following stages:

a stage for impregnation of said stabilised oxide support, a stage for drying of said stabilised and impregnated oxide support operating in a fluidised bed in the presence of a gas, said support being subjected to a temperature rise ramp of between 0.5 and 5° C./min to attain a temperature of between 50 and 170° C., the residence time of said support once the drying temperature is reached in said drying stage being between 20 and 180 min, and a stage for calcination of said dried impregnated stabilised oxide support.

An advantage of the preparation process according to the invention is that it permits the production of catalysts which are hydrothermally more stable and which have a mean size of crystallites of metal from group VIII of less than 14 nm.

The attraction of the invention lies in the implementation, in a stage for stabilisation of said oxide support, of a specific drying stage, referred to as the rapid drying stage, which is independent of the calcination stage and carried out after the impregnation stage of said stabilisation stage. In fact, implementation of said drying stage in said stabilisation stage makes it possible to achieve better distribution of the metal from group VIII in the support in the initial stage for stabilisation of the support, thus facilitating the formation of the spinel phase in a strong interaction with the support by virtue of the rapid drying stage, which makes it possible to obtain enhanced hydrothermal stability for the final catalyst.

Moreover the combination of that rapid drying stage in the stabilisation stage with a linked sequence of at least one stage for impregnation, fluidised bed drying and calcination, optionally in a fluidised bed, also makes it possible to limit the formation of a crust or aggregates of metal from group VIII and preferably cobalt at the periphery of the catalyst grains for high levels of content of metals from group VIII.

Another subject of the present invention also concerns a process for Fischer-Tropsch synthesis from a mixture of carbon and hydrogen using a catalyst prepared according to the preparation process according to the invention, said Fischer-Tropsch synthesis process operating at a temperature of between 190 and 240° C., at a total pressure of between 1 and 5 MPa and with an $H_2/CO$ molar ratio of between 1.5 and 2.5.

DESCRIPTION OF THE INVENTION

According to the invention the process for the preparation of a catalyst comprising an active phase comprising at least one metal from group VIII selected from cobalt, nickel, ruthenium and iron, alone or as a mixture, and an oxide support, said process comprising:

at least one stage for stabilisation of said oxide support, consisting of:

a stage for impregnation of said oxide support, a rapid drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute, and a stage for calcination of said impregnated and dried oxide support, said calcination operation being carried out in one or two stages, said stabilisation stage being followed by at least once the linked sequence of the following stages:

a stage for impregnation of said stabilised oxide, a stage for drying of said stabilised and impregnated oxide support operating in a fluidised bed in the presence of a gas, said support being subjected to a temperature rise ramp of between 0.5 and 5° C./min to attain a temperature of between 50 and 170° C., the residence time of said support once the drying temperature is reached in said drying stage being between 20 and 180 min, and a stage for calcination of said dried impregnated stabilised oxide support.

Hereinafter throughout the text the term drying is used to denote a heat treatment stage making it possible to obtain a solid with a loss on ignition (LOI) at 1000° C. of between 10 and 22% and not giving rise to the formation of crystallised cobalt oxide which can be detected by X-ray diffraction.

The term calcination is used to denote a heat treatment stage permitting total decomposition of the nitrates and transformation of all the counter-ions of metallic salts of the metal from group VIII (for example for cobalt, the precursor $Co(NO_3)_2$), to cobalt oxides.

According to the invention the catalyst prepared by the process of the invention comprises an active metallic phase comprising at least one metal from group VIII selected from cobalt, nickel, ruthenium and iron, alone or as a mixture. Very preferably the active phase comprises cobalt. The active phase is advantageously deposited on an oxide support. In the case where the active phase comprises at least one metal from group VIII selected from cobalt, nickel, ruthenium and iron, the content of metal from group VIII is advantageously between 1 and 60% by weight with respect to the weight of catalyst, preferably between 5 and 30% by weight with respect to the weight of the catalyst and very preferably between 10 and 30% by weight with respect to the weight of the catalyst. In the case where the active phase comprises ruthenium the metallic ruthenium content is between 0.01 and 10% by weight with respect to the weight of the catalyst and very preferably between 0.05 and 0.5% by weight with respect to the weight of the catalyst. The active phase of the catalyst prepared according to the process of the present invention also advantageously comprises at least one additional metal selected from platinum, palladium, rhenium, ruthenium, manganese and tantalum and very preferably selected from platinum, ruthenium and rhenium. The additional metal or metals is or are preferably present in a content of from 0.01 to 2% by weight, preferably 0.02 to 0.3% by weight of metal with respect to the weight of the catalyst.

The oxide support of the catalyst prepared by the process according to the invention, on which the active phase is deposited, is advantageously selected from simple oxides and preferably from alumina ($Al_2O_3$), silica ($SiO_2$), titanium oxide ($TiO_2$), ceric oxide ($CeO_2$) and zirconia ($ZrO_2$). That oxide support can also advantageously comprise a plurality of simple oxides selected from alumina ($Al_2O_3$), silica ($SiO_2$), titanium oxide ($TiO_2$), ceric oxide ($CeO_2$) and zirconia ($ZrO_2$). Preferably the oxide support of the catalyst prepared by the process according to the invention comprises silica and alumina. Very preferably the oxide support is formed by silica-alumina. In that case the support formed by silica-alumina preferably comprises 1 to 30% by weight of silica with respect to the total weight of the support. The silica-alumina is homogeneous on the micrometre scale, preferably homogeneous on the nanometre scale.

Macroscopically the support is in the form of a powder whose granulometry is entirely between 10 and 300 micrometres (μm). The mean granulometry is between 50 and 120 μm.

According to the invention the preparation process comprises a stage for stabilisation of said oxide support, said stabilisation stage being implemented with the linked sequence of the impregnation, drying and calcination stages permitting deposit of the active phase.

The stabilisation stage for the oxide support consists of:

- an impregnation stage, preferably dry, of the oxide support, preferably by an aqueous solution of one or more salts of a metal selected from magnesium (Mg), copper (Cu), cobalt (Co), nickel (Ni), tin (Sn), zinc (Zn), lithium (Li), calcium (Ca), caesium (Cs), sodium (Na), iron (Fe) and manganese (Mn), preferably cobalt, nickel, magnesium, calcium and zinc and preferably cobalt. Said impregnation stage makes it possible to impregnate a metal content of between 1 and 10% by weight with respect to the total mass of the final catalyst,
- a drying stage in which said impregnated oxide support is entrained by means of a gas, said impregnated oxide support being subjected in said stage to a temperature rise ramp of between 250 and 600° C./min, the residence time of said impregnated oxide support in said drying stage being between 1 second and 1 minute,
- a stage for calcination of said impregnated and dried oxide support, the calcination operation being implemented in one or two stages.

According to the invention a drying stage, referred to as the rapid drying stage, for said impregnated oxide support is carried out between the impregnation stage and the calcination stage of the stabilisation stage.

In said drying stage said impregnated oxide support is entrained by means of a gas, said impregnated oxide support being subjected to a temperature rise ramp of between 250 and 600° C./min, preferably between 300 and 600° C./min, preferably between 350 and 600° C./min, more preferably between 350 and 550° C./min, the residence time of said impregnated oxide support in said drying stage being between 1 second and 1 minute, preferably between 5 and 40 seconds and preferably between 5 and 30 seconds.

That drying stage is referred to as the rapid drying stage as the drying mode used makes it possible to achieve a very short contact time between the catalyst and the gas in a very high gas flow rate permitting the water to be very rapidly eliminated.

Preferably the gas used in the drying stage is air, alone or mixed with an inert gas.

Preferably the temperature of the gas at the entry to the drying stage is between 300 and 800° C., preferably between 400 and 700° C. and very preferably between 400 and 600° C.

Preferably the pressure in the course of the drying stage is between 0.02 and 0.2 MPa and preferably between 0.05 and 0.1 MPa.

Preferably the drying stage operates in the presence of a gas flow rate of between 2 and 4 Nl/h/g of catalyst, preferably between 2.6 and 3.2 Nl/h/g of catalyst.

During the drying stage the temperature of the oxide support which is impregnated and entrained in the drying stage is between 50 and 60° C. in the preferred temperature and flow rate range.

The drying operation is an important stage in preparation of the catalyst according to the invention. The impregnation, drying and calcination stages are performed independently of each other.

The drying stage makes it possible to entrain an impregnated oxide support powder, which is possibly stabilised, being of a granulometry of less than 200 μm, and with a loss on ignition, LOI, of between 20 and 50% on issuing from the impregnation stage. On issuing from the drying stage the impregnated and dried oxide support is in the form of a powder of a granulometry of less than 200 μm and a loss on ignition measured at 1000° C. (LOI at 1000° C.) of between 10 and 22%.

The drying stage is advantageously carried out in any apparatus known to the man skilled in the art permitting entrainment of a powder with an LOI of between 20 and 50%, of a granulometry of less than 300 μm, and making it possible to achieve a very short contact time in a very high air flow rate and at an elevated temperature. Preferably the drying stage is advantageously carried out in an apparatus selected from entrained beds and flash driers. Flash driers are in particular widely used in the field of agri-food and are marketed by companies like Barr-Rosin, Niro and can advantageously be used as driers in the present invention.

The rapid drying stage which is independent of the calcination stage and carried out after said impregnation stage of said stabilisation stage makes it possible to avoid surface migration of the metal from group VIII and preferably cobalt and also avoids the formation of aggregates of the metal from group VIII and preferably cobalt within the grains of catalyst obtained.

Thus the rapid drying stage permits both highly efficient drying and the surprising achievement of very good distribution of the cobalt within the grains, which then facilitates the formation of a spinel phase in strong interaction with the support, thus imparting increased hydrothermal resistance to the catalyst.

According to the invention the stage for calcination of the dried and impregnated oxide support of the stabilisation stage of the process according to the invention is carried out in one or two stages.

In the case where calcination of the dried and impregnated oxide support is carried out in one stage the calcination operation is advantageously performed in air at a temperature of between 700 and 1200° C., preferably between 850 and 1200° C. and preferably between 850 and 900° C. for a period of between 1 hour and 24 h.

In the case where calcination of the dried and impregnated oxide support is carried out in two stages the calcination operation is advantageously performed at a temperature of between 300° C. and 600° C. in air for a period between half an hour and 3 hours, then at a temperature between 700° C. and 1200° C., preferably between 850 and 1200° C. and preferably between 850 and 900° C. for a period of between 1 hour and 24 hours and preferably between 2 hours and 5 hours.

At the end of the stabilisation stage the oxide support on which the active phase is deposited comprises a spinel enclosed in an alumina or a silica-alumina, preferably in a silica-alumina. In particular the oxide support of the catalyst is advantageously formed by a simple spinel enclosed in a silica-alumina of type $MAl_2O_4/Al_2O_3.SiO_2$ or a mixed spinel enclosed in a silica-alumina of type $M_xM'_{(1-x)}Al_2O_4/$ $Al_2O_3.SiO_2$ in which M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), iron (Fe) and manganese (Mn) in which $Al_2O_3.SiO_2$ denotes the chemical formula of a silica-alumina, in which x is between 0 and 1, the values 0 and 1 being themselves excluded.

The stabilised oxide support obtained is formed by a spinel structure which advantageously comprises at least 5% by weight of said spinel structure, preferably at least 10% and still more preferably at least 15% by weight with respect to the total weight of the support. The silica-alumina in which the spinel structure is preferably enclosed preferably comprises 1 to 30% by weight of silica with respect to the total weight of the support. It is homogeneous on the micrometre scale and still more preferably homogeneous on the nanometre scale.

The stabilisation stage makes it possible to limit the attacks of the Fischer-Tropsch synthesis reaction medium (water, acids). At the discharge from the stabilisation stage the metal from group VIII and preferably the cobalt which is added in that way involves a very strong interaction with the oxide support and cannot therefore be reduced in the Fischer-Tropsch catalyst reduction range which is well known to the man skilled in the art (reduction temperature lower than 550° C.).

According to the invention the stabilisation stage is followed by at least once the linked sequence of the impregnation, drying and calcination stages for the stabilised oxide support.

Preferably the linked sequence of said impregnation, drying and calcination stages is performed in that order.

The number of linked sequences depending on the desired final content of the element of group VIII and the initial pore volume of the oxide support used, the linked sequence of steps can be performed as many times as necessary.

In a preferred embodiment the linked sequence of the impregnation, drying and calcination stages of the preparation process according to the invention, preferably in that order, is performed at least twice. In that case the preparation process according to the invention therefore comprises after each impregnation stage a drying stage which is independent of the calcination stage.

The stage for impregnation of the stabilised oxide support is advantageously performed by at least one solution containing at least one precursor of the metal from group VIII. In particular that stage can advantageously be effected by dry impregnation, by impregnation in excess or again by deposit-precipitation using methods well known to the man skilled in the art. Preferably the impregnation stage is carried out by dry impregnation, preferably at ambient temperature and preferably at a temperature equal to 20° C. The impregnation stage involves bringing the oxide support into contact with at least one solution containing at least one precursor of the metal from the group VIII, the volume of which is equal to the pore volume of the support to be impregnated. That solution contains the metallic precursors of the metal or metals from group VIII at the desired concentration to achieve on the final catalyst the desired metal content. The impregnation stage can also advantageously be performed at any other temperature compatible with that technology, preferably between 5° C. and 40° C., preferably between 15° C. and 25° C. and very preferably between 17° C. and 23° C.

In the preferred embodiment in which the linked sequence of the impregnation, drying and calcination stages for the stabilised oxide support, preferably in that order, is performed twice, the first stage for impregnation of the oxide support which is possibly stabilised permits the deposit of 2 to 15% by weight and preferably 5 to 10% by weight of at least one metal from group VIII selected from cobalt, iron and ruthenium and preferably cobalt, with respect to the total mass of the final catalyst and the second stage for impregnation of the oxide support which is stabilised permits the deposit of 2 to 15% by weight and preferably 5 to 10% by weight of at least one metal from group VIII selected from cobalt, iron and ruthenium and preferably cobalt, with respect to the total mass of the final catalyst. In the case where the element from group VIII is cobalt, those two stages permit the deposit of a content of metallic cobalt which can be between 4 and 30% by weight and preferably between 10 and 20% by weight with respect to the total mass of the final catalyst.

The metal or metals from group VIII are brought into contact with the stabilised oxide support by way of any metallic precursor soluble in an aqueous or an organic phase. When it is introduced in an organic solution the precursor of the metal from group VIII is preferably oxalate or acetate of said metal from group VIII. Preferably the precursor of the metal from group VIII is introduced in aqueous solution, preferably in the form of nitrate, carbonate, acetate, chloride, oxalate, complexes formed by a polyacid or an acid-alcohol and its salts, complexes formed with acetyl acetonates, or any other inorganic derivative soluble in aqueous solution, which is brought into contact with said support. In the preferred case where the metal from group VIII is cobalt the cobalt precursor which is advantageously used is cobalt nitrate, cobalt oxalate or cobalt acetate.

The stage for impregnation of the stabilised oxide support of the catalyst prepared according to the invention can also advantageously comprise at least one additional stage involving depositing at least one additional metal selected from platinum, palladium, rhenium, rhodium, ruthenium, manganese and tantalum, alone or in the form of a mixture, on said oxide support. Preferably the additional metal is selected from platinum, ruthenium and rhenium and very preferably the additional metal is platinum. Deposit of the additional metal on the support can advantageously be performed by any method known to the man skilled in the art, preferably by impregnation of the oxide support with at least one solution containing at least one precursor of the additional metal and preferably by dry impregnation or by impregnation in excess. The additional metal may also advantageously be added in the stage for impregnation of the metal of group VIII.

According to the invention a stage for fluidised bed drying of the impregnated and stabilised oxide support is carried out after the impregnation stage. The fluidised bed drying stage may be effected either in batch mode or in continuous mode, the latter mode being preferred.

According to the invention the drying stage for the impregnated stabilised oxide support is carried out in a fluidised bed, in the presence of a gas, the support being subjected to a temperature rise ramp of between 0.5 and 5° C./min, preferably between 0.7 and 4° C./min, to attain a temperature between 50 ands 170° C. and preferably between 60 and 140° C., the residence time of the support, once the drying temperature is reached, in the drying stage being between 20 and 180 min and preferably between 50 and 120 min.

The fluidised bed technique is well known to the man skilled in the art. The impregnated stabilised oxide support is for example introduced after the impregnation stage on a grid, a frit or any other means making it possible to retain a solid of a granulometry of between 10 and 300 μm in the fluidised bed reactor. Injection of gas into the reactor under said grid at a flow rate which makes it possible to lift the powder is then effected. The gas flow rate is added in a manner known to the man skilled in the art to permit fluidisation.

Preferably the gas is air, possibly mixed with an inert gas.

According to the invention a stage for calcination of the dried impregnated stabilised oxide support is carried out after the impregnation stage. That calcination stage is advantageously performed independently of the rapid drying stage.

In a variant the calcination stage is carried out in an apparatus selected from a ventilated oven, a fluidised bed or a rotating furnace. In that case the calcination step is advantageously performed at a temperature of between 320° C. and 460° C., preferably between 350 and 440° C. and preferably between 360 and 420° C. It is advantageously performed for a period of between 15 min and 15 h and preferably between 30 min and 12 h and still more preferably between 1 h and 6 h.

In another variant the calcination stage is performed in a fluidised bed, preferably in the same apparatus as said drying stage, in the presence of a gas, the dried impregnated stabilised oxide support being subjected to a temperature rise ramp of between 0.5 and 5° C./min, preferably between 0.7 and 4° C./min, to attain a temperature of between 300 and 450° C. and preferably between 350 and 450° C., the residence time of the support, once the drying temperature attained, in said drying stage being between 5 and 120 min and preferably between 10 and 100 min.

The catalyst obtained at the issue from the preparation process according to the invention is in oxide form after the stabilisation stage and the linked sequence of the impregnation, drying and calcination stages which is performed at least once. It has crystallites of oxide of the metal from group VIII which is present in the active phase of the catalyst, preferably crystallites of cobalt oxide $CO_3O_4$.

The preparation process according to the invention may advantageously also comprise at least one stage for reduction of the catalyst obtained, the reduction stage being performed after the linked sequence of the impregnation, drying and calcination stages for the stabilised oxide support.

In fact prior to its use in a catalytic reactor for Fischer-Tropsch synthesis the catalyst obtained at the end of the process according to the present invention is preferably subjected to at least one reduction stage. The reduction stage is intended to activate the catalyst and form particles of metal in the zero valent state and is for example performed in pure or dilute hydrogen at high temperature.

When the metal from group VIII used is cobalt the reduction stage makes it possible to carry out the following reaction:

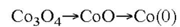
$Co_3O_4 \rightarrow CoO \rightarrow Co(0)$

The reduction stage is advantageously implemented at a temperature between 200 and 500° C. and for a period of between 2 and 20 hours.

The reduction stage is advantageously effected either in situ, that is to say in the same reactor as that in which the Fischer-Tropsch reaction is performed, or ex situ before being loaded into the reactor.

The present invention also concerns the catalyst which is capable of being produced by the preparation process according to the invention.

The catalyst obtained at the end of the preparation process according to the invention comprises an active metallic phase comprising at least one metal from group VIII selected from cobalt, nickel, ruthenium and iron, alone or as a mixture, and an oxide support as defined hereinbefore.

The oxide support on which the active phase is deposited may advantageously be of a morphology in the form of powder of a variable granulometry, in particular when the catalyst is used in a reactor of slurry bubble column type. The size of the grains of the catalyst may advantageously be between a few microns and some hundreds of microns. For use in a slurry reactor the size of the particles of the catalyst prepared using the process according to the invention is preferably between 10 microns and 500 microns, preferably between 10 microns and 300 microns, very preferably between 20 and 150 microns and still more preferably between 30 and 120 microns.

The catalyst obtained at the end of the preparation process according to the invention has a mean size of crystallites of metal of group VIII of less than 14 nm.

The catalyst obtained in that way comprises grains in which the metal from group VIII and preferably cobalt is distributed homogeneously in the grains and at their surface, which grains have no or little aggregates of metal from group VIII, the formation of crust at the periphery of the catalyst grains being limited.

The distribution of the metal of group VIII and preferably cobalt in the interior of the grains of catalyst obtained by the process according to the invention and the presence or absence of a layer of metal from group VIII and preferably cobalt which is also referred to as the crust is detected for example by X-microanalysis by electronic probe or by retrodiffused-electron scanning electron microscopy (SEM).

The catalyst obtained at the end of the preparation process according to the invention may advantageously be employed in reactions carried out in suspension in a three-phase fluidised reactor, preferably of bubble column type. In this preferred use of the catalyst the catalyst is divided in the state of very fine powder, in particular of the order of some tens of microns and for example between 5 microns and 300 microns, preferably between 20 microns and 150 microns and still more preferably between 20 and 120 microns. That technology is also known by the terminology of the 'slurry process' by the man skilled in the art.

That catalyst can also be advantageously used in different types of reactors and for example in a fixed bed, in a movable bed, in a bubble column or again in a three-phase fluidised bed.

The invention also concerns a process for Fischer-Tropsch synthesis from a mixture of carbon and hydrogen using a catalyst prepared according to the preparation process according to the invention, the Fischer-Tropsch synthesis process operating at a temperature of between 190 and 240° C. at a total pressure of between 1 and 5 MPa and with an $H_2/CO$ molar ratio of between 1.5 and 2.5.

The invention is illustrated by the following examples.

EXAMPLE 1

Comparative

Catalyst A1 is prepared in the following fashion:

Preparation of the support which is stabilised by dry impregnation of an aqueous solution of cobalt nitrate on a commercial powder of silica-alumina (SIRALOX® 5/170 SCCa, SASOL GmbH) of a mean granulometry equal to 80 μm, with a surface area of 171 m2/g and a pore volume equal to 0.55 ml/g. The concentration of the solution being selected in order to attain a Co content in the silica-alumina of 5% (measured by FX) on the final stabilised support. The impregnated solid is then introduced into an oven swept by an uncontrolled flow of air, the temperature is raised by way of a ramp from 1° C./min to 120° C., the level is maintained for 240 min. The dried solid is then introduced into a high-temperature calcination furnace where it is calcined at a temperature of 850° C. minimum for at least 3 hours with a rise in the temperature with a ramp of 2.5° C./min. The resulting solid has a profile in respect of temperature reduction in programmed form by a 5% H2/95% argon mixture (a procedure which is well known to the man skilled in the art) with a 5° C./min ramp, which does not have any species which can be reduced prior to a temperature of 900° C. (no consumption of hydrogen by the solid).

The reducible cobalt is then added to the support which is stabilised by dry impregnation of an aqueous solution of cobalt nitrate so as to deposit in two successive stages of the order of 14% by weight of Co.

After a first dry impregnation operation the solid is dried in a drying oven at 120° C. for 3 h in an air flow at an uncontrolled flow rate. The temperature is then raised to 420° C. using a 1° C./min ramp in an uncontrolled air flow rate for a period of 4 h. The intermediate catalyst contains 13.3% by weight of Co in total. It is subjected to a second dry impregnation stage by means of a solution of cobalt nitrate. The solid obtained is dried in a drying oven at 120° C. for 3 h in an uncontrolled flow of air. Calcination is then performed at a temperature of 420° C. using a 1° C./min ramp in an uncontrolled flow of air for a period of 4 h. The final catalyst A1 is obtained, which contains 19.5% by weight of Co in total.

The mean size of the crystallites of $CO_3O_4$ measured by XRD is 19 nm.

EXAMPLE 2

According to the Invention

Catalyst A2 is prepared in the following fashion:

Preparation of the support which is stabilised by dry impregnation of an aqueous solution of cobalt nitrate on a commercial powder of silica-alumina (SIRALOX® 5/170 SCCa, SASOL GmbH) of a mean granulometry equal to 80 μm, with a surface area of 171 m2/g and a pore volume equal to 0.55 ml/g. The concentration of the solution being selected in order to attain a Co content in the silica-alumina of 5% (measured by FX) on the final stabilised support. The solid is then dried in an entrained bed in a flow of air with a ramp of 360° C./min in a flow of air of 2.63 Nl/h/g of catalyst for a period of 10 s in a flow of air. The catalyst is then discharged. The dried solid is then introduced into a high-temperature calcination furnace where it is calcined at a temperature of 850° C. minimum for at least 3 hours with a rise in the temperature with a ramp of 2.5° C./min. The resulting solid has a profile in respect of temperature reduction in programmed form by a 5% H2/95% argon mixture (a procedure which is well known to the man skilled in the art) with a 5° C./min ramp, which does not have any species which can be reduced prior to a temperature of 900° C. (no consumption of hydrogen by the solid before that temperature).

The reducible cobalt is then added to the support which is stabilised by dry impregnation of an aqueous solution of cobalt nitrate so as to deposit in two successive stages of the order of 14% by weight of Co.

After a first dry impregnation operation the solid is dried in a fluidised bed at 90° C. in a flow of air of 1 Nl/h/g of catalyst for a period of 1 h. The dried solid is then calcined in the same fluidised bed with a 1° C./min ramp to a temperature of 400° C. in a flow of air of 1 Nl/h/g of solid and the temperature level is maintained for 1 hour. The intermediate catalyst contains about 13% by weight of Co in total. It is subjected to a second dry impregnation stage by means of a solution of cobalt nitrate. The solid is dried in a fluidised bed at 90° C. using a 1° C./min ramp in a flow of air of 1 Nl/h/g of catalyst for a period of 1 hour. The dried solid is then calcined in the same fluidised bed using a 1° C./min ramp to a temperature of 400° C. in a flow of air of 1 Nl/h/g of solid, the temperature level being maintained for 60 min. The final catalyst A2 is obtained, which contains 19.5% by weight of Co in total.

The mean size of the crystallites of $CO_3O_4$ measured by XRD is 16 nm.

EXAMPLE 3

Comparison of the Hydrothermal Resistances

Characterisation of hydrothermal resistance is implemented by bringing 2 grams of each of the catalysts studied into contact with a mixture of water, heptane, pentane (17%/48%/35% by weight respectively) at 200° C. for a period of 300 h in an autoclave using a static mode of operation under autogenous pressure.

After drying the product is finally analysed by X-ray diffraction, and an amount of boehmite formed is determined. The higher that amount is, the less the catalyst is considered as being resistant on the hydrothermal plane. The hydrothermal resistances of the solids A1 and A2 have been characterised in accordance with the above-described protocol.

| Catalyst | % boehmite (measured by XRD) |
|---|---|
| A1 | 8 |
| A2 | 3 |
| SIRALOX5 ® Scca (SASOL GmbH) (support alone) | 90% |

EXAMPLE 4

The catalysts A1 and A2 before being successively tested in respect of conversion of the synthesis gas are reduced ex situ in a flow of pure hydrogen at 400° C. for a period of 16 hours in a tubular reactor. Once the catalyst is reduced it is discharged in an argon atmosphere and encased in some Sasolwax® to be stored sheltered from air prior to the test. The Fischer-Tropsch synthesis reaction is carried out in a reactor of slurry type which functions continuously and which operates with a concentration of 10% (vol) of catalyst in the slurry phase.

Each of the catalysts is in the form of powder of a diameter of between 40 and 150 microns.

The test conditions are as follows:

Temperature=230° C.

Total pressure=2 MPa $H_2$/CO molar ratio=2.

The conversion of CO is maintained at between 45 and 50% throughout the entire duration of the test.

The test conditions are adjusted so as to be at iso conversion of CO, irrespective of the activity of the catalyst.

Activity is calculated in the following fashion:

$$\text{Activity} = \exp\left(\frac{-E}{RT_{base}}\right)\cdot\exp\left(\frac{E}{RT_{ref}}\right)$$

with $T_{base}$=225° C.

E=activation energy

R=constant of the completed gases $T_{ref}$=T of a reference catalyst.

For a reference catalyst the activity is 100%, the reference temperature is then equal to the base temperature.

The results were calculated for the catalysts A1 and A2 with respect to the reference catalyst involving an activity of 100% and are set out in Table 1 below. The alpha paraffin selectivities are given as well as the selectivity in respect of $C_{5+}$ compounds.

Measurement of the selectivity in respect of alpha paraffin is implemented by way of an analysis by gaseous phase chromatography of the effluents from the reaction, metering of the paraffins and calculation of the slope of the log curve mol (%)=f (carbon number) which corresponds to the alpha.

| Catalyst | A1 | A2 |
|---|---|---|
| activity after 300 h (%) | 320 | 340 |
| Selectivity C5+ (%) | 80.5 | 81.1 |
| Selectivity alpha paraffins | 0.898 | 0.902 |

The results of Table 1 show that the catalytic performances of the catalysts A1 and A2 are equivalent both in terms of activity and selectivity if account is taken of the uncertainties linked to the use of a catalytic test and the degree of precision of the analyses.

The catalyst A2 can therefore be considered as equivalent to the catalyst A1 in terms of intrinsic catalytic performances but the catalyst A2 is superior in terms of hydrothermal resistance.

The invention claimed is:

1. A process for the preparation of a catalyst comprising an active phase comprising at least one metal from group VIII selected from cobalt, nickel, ruthenium and iron, alone or as a mixture, and an oxide support, said process comprising:

stabilizing said oxide support, comprising:

impregnating of said active phase into said oxide support, drying impregnated oxide support entrained by means of a gas, said impregnated oxide support being subjected in said drying to a temperature rise ramp of 250 to 600° C./min, the residence time of said impregnated oxide support in said drying being 1 second to 1 minute, and calcining of said impregnated and dried oxide support, said calcination operation being carried out in one or two stages, said stabilizing of the oxide support being followed by at least one sequence of the following:

impregnating of stabilized oxide support, drying of stabilized and impregnated oxide support operating in a fluidized bed in the presence of a gas, said support being subjected to a temperature rise ramp of 0.5 to 5° C./min to attain a temperature of 50 to 170° C., the residence time of said support once the drying temperature is reached in said drying stage being between 20 and 180 min, and calcining of dried impregnated stabilized oxide support.

2. A process according to claim 1 wherein said active phase comprises cobalt.

3. A process according to claim 1 wherein said oxide support of the catalyst is alumina ($Al_2O_3$), silica ($SiO_2$), titanium oxide ($TiO_2$), ceric oxide ($CeO_2$), zirconia ($ZrO_2$), or a mixture thereof.

4. A process according to claim 1 wherein said oxide support is silica-alumina.

5. A process according to claim 1 wherein the gas used in said drying in the stabilization is air alone or mixed with an inert gas.

6. A process according to claim 1 wherein the temperature of the gas at the entry to drying of the stabilization is 300 to 800° C.

7. A process according to claim 1 wherein the calcination in the stabilization is carried out in one stage in air at a temperature of 700 to 1200° C. for a period of 1 hour to 24 h.

8. A process according to claim 1 wherein the calcination in the stabilization is carried out in two stages at a temperature of 300° C. to 600° C. in air for a period of half an hour to three hours, and then at a temperature of 700° C. to 1200° C. for a period of 1 hour to 24 h.

9. A process according to claim 1 wherein after stabilization the sequence impregnation, drying and calcination in that order is effected at least twice.

10. A process according to claim 1 wherein said calcination of said dried, impregnated and stabilized oxide support is carried out at a temperature of 320° C. to 460° C. and for a period of 15 min to 15 h.

11. A process according to claim 1 wherein said calcination of said dried and impregnated stabilized oxide support is carried out in a fluidized bed in the presence of a gas, said dried and impregnated stabilized oxide support being subjected to a temperature rise ramp of 0.5 to 5° C./min to attain a temperature of 300 to 450° C., the residence time of said support once the drying temperature is reached in said drying stage being 5 to 120 min.

12. A process for Fischer-Tropsch synthesis from a mixture of carbon and hydrogen using a catalyst prepared according to the preparation process according to claim 1, said Fischer-Tropsch synthesis process operating at a temperature of 190 to 240° C., at a total pressure of 1 to 5 MPa and with an $H_2/CO$ molar ratio of 1.5 to 2.5.

* * * * *